(12) United States Patent
Solomon et al.

(10) Patent No.: US 7,445,343 B2
(45) Date of Patent: Nov. 4, 2008

(54) MODULAR DISPLAY SYSTEM

(75) Inventors: Mark C. Solomon, Corvallis, OR (US); Peter On, Corvallis, OR (US); Glen A. Oross, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 465 days.

(21) Appl. No.: 11/257,869

(22) Filed: Oct. 25, 2005

(65) Prior Publication Data

US 2007/0091284 A1  Apr. 26, 2007

(51) Int. Cl.
*G03B 21/14* (2006.01)
(52) U.S. Cl. .............................. 353/94; 353/15; 353/119
(58) Field of Classification Search .................... 353/15, 353/119, 94
See application file for complete search history.

(56) References Cited

U.S. PATENT DOCUMENTS

| | | | |
|---|---|---|---|
| 5,568,963 A | | 10/1996 | Bennett et al. |
| 5,630,659 A | * | 5/1997 | Ronzani et al. ............... 353/15 |
| 5,664,859 A | | 9/1997 | Salerno et al. |
| 6,966,651 B2 | * | 11/2005 | Johnson ........................ 353/15 |
| 7,114,810 B2 | * | 10/2006 | Bakkom et al. ............... 353/15 |
| 7,303,282 B2 | * | 12/2007 | Dwyer et al. .................. 353/15 |
| 2004/0246450 A1 | | 12/2004 | Soper et al. |
| 2005/0088620 A1 | | 4/2005 | Dwyer et al. |
| 2005/0088621 A1 | * | 4/2005 | Ikeuchi ........................ 353/15 |
| 2005/0140941 A1 | | 6/2005 | Maddock |

* cited by examiner

*Primary Examiner*—William C. Dowling

(57) ABSTRACT

One embodiment of a modular display system includes structure for projecting an image stored on a display media, wherein the structure for projecting an image defines a housing structured to define a repeating, uniform, structure when adjacent housings mate with and are electrically connected to one another.

27 Claims, 2 Drawing Sheets

MODULAR DISPLAY SYSTEM

Display systems may include multiple components such as a projector, an audio system and a media player, for example, a DVD or a video player. Increasing the flexibility of the system by allowing separate purchase and connection of the individual components may be desirable.

DETAILED DESCRIPTION OF THE DRAWINGS

Figure 1:
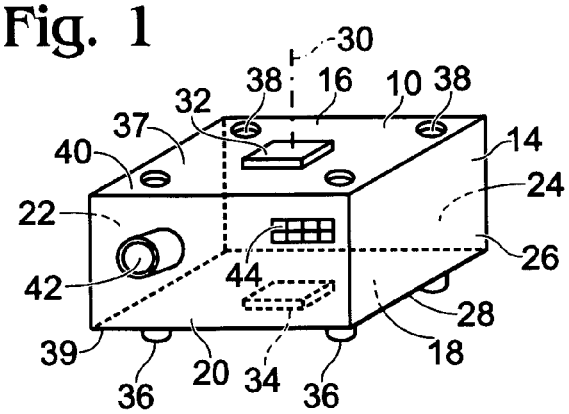
FIG. 1 represents a perspective view of one component of a modular display system according an embodiment of the present invention.

FIG. 1 is a perspective view that represents one embodiment of one modular component 10 of a modular display system 12 (see FIG. 2) according to an embodiment of the present invention. Component 10 may include a housing 14 that defines a top surface 16, a bottom surface 18 and four side surfaces 20, 22, 24, and 26. In this embodiment, housing 14 defines a square footprint 28, having a perimeter defined by four side surfaces 20, 22, 24, and 26. In this embodiment, footprint 28 is the same size as top surface 16 and bottom surface 18. In other embodiments, housing 14 may define a rectangular, a circular, an elliptical or any other shaped footprint 28 as may be desirable for a particular application. Housing 14 may possess a central axis 30 extending through top surface 16, bottom surface 18 and footprint 28.

Housing 14 may further include a first connection port 32 positioned on top surface 16 and a second connection port 34 positioned on bottom surface 18, wherein the first and second connection ports 32 and 34 are both aligned along central axis 30. In other embodiments, the first and second connection ports 32 and 34 may be positioned on other opposing surfaces, and aligned along axis 30. First connection port 32 may be configured to be received within a second connection port 34 such that multiple modular components 10 may be stacked or snapped together, wherein the stack of multiple components 10 will each be in electrical connection with one another.

In one embodiment, first connection port 32 may be a male connection port extending outwardly from top surface 16 and second connection port 34 may be a female connection port extending inwardly of bottom surface 18. First and second connection ports 32 and 34 may be any type of connection port as may be utilized in a particular application. In one example embodiment, the connection ports may be digital or informational connection ports wherein first connection port 32 may include a plurality of bus pins and second connection port 34 may include a plurality of mating bus pin recesses. In another example embodiment, the connection ports may be digital or informational connection ports wherein first connection port 32 may be a terminal end of a coaxial cable and second connection port 34 may be a recess for receiving a terminal end of a coaxial cable. In yet another embodiment, first connection port 32 may include a light sensor and second connection port 34 may include a light source, such as an ambient light source, a LED light source, or an infrared light source. In another embodiment, first connection port 32 may include a standard double prong electrical plug and second connection port 34 may include a standard double recess electrical outlet. In still another embodiment, the connection ports 32 and 34 may each include a plurality of connection types such that first connection port 32 and second electrical port 34 may each include electrical, informational, and light components, or any other combination as may be desirable. In the embodiment wherein the connection ports define a light sensor and a light source, such connection ports may be defined as an "electrical connection" because the light transferred between components 10 may activate electrical manipulation of digitized information.

Housing 14 may further include contact elements such as outwardly extending legs 36 on bottom surface 18 and mating recesses 38 on top surface 16. The contact elements 36 and 38, and the connection ports 32 and 34, on corresponding top and bottom surfaces 16 and 18 of adjacent components 10 (see FIG. 2), may define a pattern 37 on a first surface, such as top surface 16, and a conforming, mating pattern 39 on a second surface, such as bottom surface 18. Accordingly, multiple components 10 that are stacked together may define a repeating, uniform, structure 48 (see FIG. 2) wherein adjacent housings 14 (see FIG. 2) mate with and are electrically connected to one another along central axis 30.

In the particular embodiment shown in FIG. 1, modular component 10 comprises a projector 40 including a projection lens 42 extending outwardly from side surface 20, and a control panel 44 on side surface 20. Control panel 44 may facilitate input of information to, and display of information from, projector 40 including focus information, projection light intensity information, and other such information.

Figure 2:
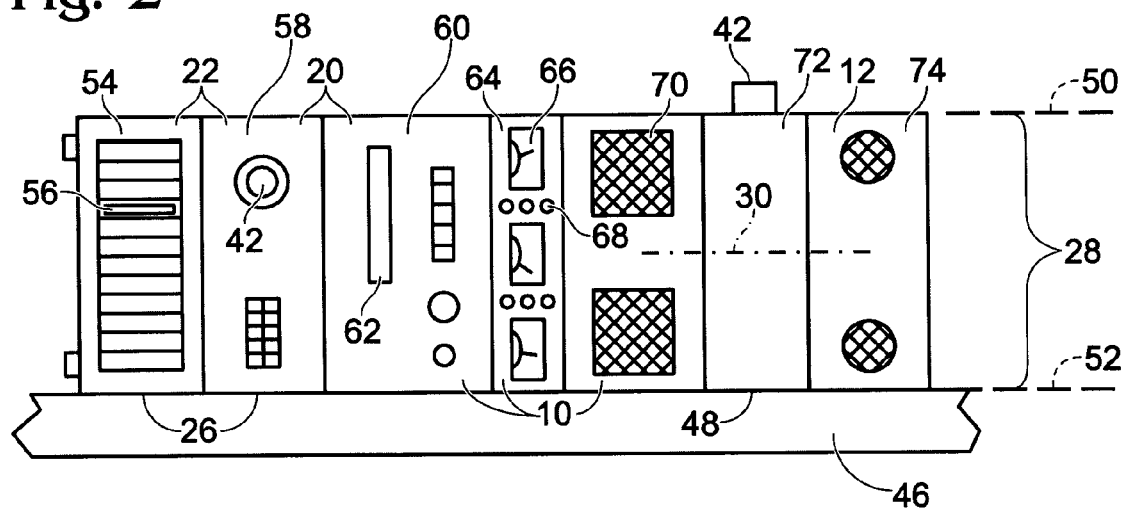
FIG. 2 represents a front view of a display system in a horizontal stacked arrangement according to an embodiment of the present invention.

FIG. 2 represents a front view of one embodiment of a display system 12 in a horizontal stacked arrangement such that the system may be placed on a book shelf 46 or the like. Display system 12 may include a plurality of modular components 10 stacked together to define a repeating, uniform, structure 48. In other words, each of modular components 10 define a substantially similar footprint 28 such that side surfaces 20, 22, 24, and 26 surfaces 22 and 26 are shown in end view and side surfaces 24 are not visible in this figure) of each of components 10 are aligned with one another. For example, side surface 22 of each of components 10 are aligned in a plane 50 (shown in end view) and side surface 26 of each of components 10 are aligned in a plane 52 (shown in end view). In this embodiment, repeating, uniform structure 48 defines a square cross-sectional elongate member extending along axis 30.

Still referring to FIG. 2, display system 12 may include a storage component 54 that may be adapted to store items, such as media devices 56, for example, DVDs or video cassettes. System 12 may further include a projector 58 including a projection lens 42 facing frontwardly and outwardly of side surface 20. System 12 may also include a media device player 60, such as a DVD player or a video player, including a media device tray 62. System 12 may further include a controller 64 including indicators 66, such as one or more display screens, and input devices 68, such as toggle switches, control knobs and the like. Display system 12 may also include an audio device 70, such as a set of "woofer" speakers, and a second projector 72 including a projection lens 42 facing upwardly and outwardly of side surface 22. Display system may further include a second audio device 74, such as a set of "sub woofer" speakers. Inclusion of multiple audio devices within display system 12 may allow the use of specialized audio components or the positioning of audio components to project sounds in a variety of directions. Similarly, inclusion of multiple projection devices within display system 12 may allow the projection of multiple image displays onto multiple display surfaces, such as on three walls and the ceiling of a trade show booth (not shown), or on the four walls and the ceiling and floor of a multimedia room in a personal residence (not shown). In some embodiments, the number of projection devices may match the number of media device players in the system, such as the inclusion of three projectors and three corresponding media device players. Controller 64 may be utilized to control the connection of each projector with a corresponding media device player. In other embodiments any number or combination of components may be utilized within display system 12 due to the modular stacking capabilities of components 10 of system 12.

Figure 3:
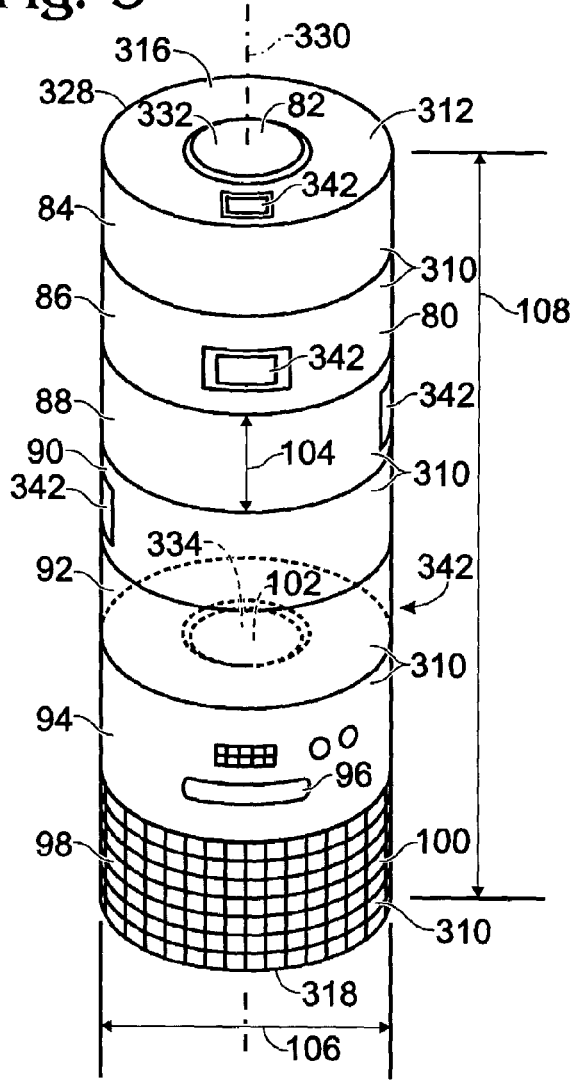
FIG. 3 represents a front view of a display system in a vertical stacked arrangement according to an embodiment of the present invention.

FIG. 3 represents a front view of a display system 312 in a vertical stacked arrangement according to an embodiment of the present invention. In this embodiment, each of components 310 define a circular footprint 328 such that system 312 defines a cylindrical tower 80 extending along axis 330. First connection port 332 defines a circularly shaped, upwardly extending projection 82 that extends upwardly from top surface 316 of a projector 84. Projector 84 further includes a projection lens 342 on top surface 316 that projects an image upwardly from tower 80. Tower 80 further includes a second projector 86 that projects an image forwardly, a third projector 88 that projects an image to the right, a fourth projector 90 that projects an image to the left, and a fifth projector 92 (the projection lens 342 of projector 92 is not viewable in this figure) that projects an image rearwardly. In this manner, tower 80 of display system 312 may project an image, for example, onto each of four walls and a ceiling of a media room or a trade show booth (not shown). Tower 80 may further include a single media device player 94. A media device, such as a DVD, received within tray 96 of player 94 may include five (or more) separate "tracks" that may provide image information to each of projectors 84 through 92. System 312 may further include an audio device 98 that may include one or more speakers that extend around the circumference of a side surface 100 of audio device 98 so as to provide audio output around a circumference of tower 80.

Each of components 310 of tower 80 are electrically connected together along axis 330 by connection of first connection ports 332 on top surfaces 316 of the components with second connection ports 334 on bottom surfaces 318 of the components. In this embodiment, second connection ports 334 are a circularly shaped, upwardly extending recess 102 that extends upwardly from bottom surface 318, as shown in dash lines on projector 92. Each of components 310 is shown having a depth 104 approximately half of a width 106 of components 310. However, in other embodiments, depth 104 may be larger than width 106 or may be much smaller than width 106, in which case tower 80 may have a relatively short, sleek total height 108.

Figure 4:
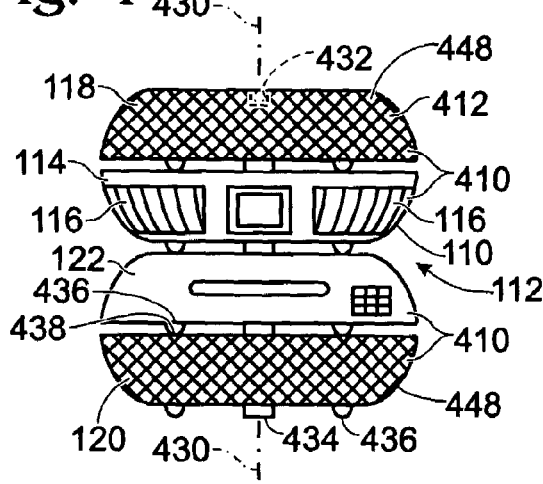
FIG. 4 represents a front view of a display system in a vertical stacked arrangement according to an embodiment of the present invention.

FIG. 4 is a perspective view that represents one embodiment of a display system 412 in a vertical stacked arrangement wherein each of components 410 define a sloping side surface 110. Sloping side surface 110 may allow an air gap 112 between alternating adjacent components 410, which may allow venting of heat from heat generating components, such as a projector 114, through vents 116 that may extend substantially around a perimeter of projector 114. In this embodiment, system 412 may include audio devices 118 and 120 and a media device player 122, all electrically connected by connection ports aligned along axis 430.

In the embodiment shown in FIG. 4, footprints 428 of each of audio device 118 and media device player 122 are defined by bottom surface 418 of these components. Footprints 428 of projector 116 and audio device 120 are each defined by top surface 416 of these components. In other words, footprint 428 of system 412 and each of the components therein may be uniform along the stacked, repeating, structure 448 of display system 412 and may be defined by the largest outside perimeter of the side surface or surfaces of modular components 410. In particular, in this embodiment, stacked, repeating, uniform structure 448 may be a repeating clamshell structure.

Figure 5:
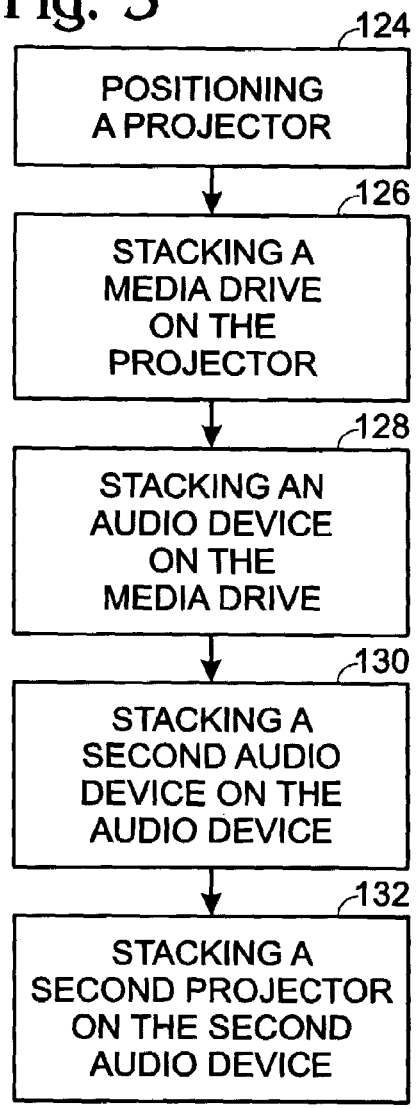
FIG. 5 is a flowchart of a method of connecting one embodiment of components of a display system according to an embodiment of the present invention.

FIG. 5 is a flowchart of one embodiment of a method of connecting one embodiment of components of a display system according to the present invention. The method may include a first step 124 of positioning a projector to project an image, wherein the projector may define a first electrical connection port positioned on an axis extending through the projector. A second step 126 may include stacking a media drive device on the projector such that the projector and the media drive device are electrically connected to one another at the first electrical connection port, and wherein the media drive device defines a second electrical connection port spaced from said first electrical connection port and aligned along the axis. A third step 128 may include stacking an audio device on the media drive device such that the media drive device and the audio device are electrically connected to one another at the second electrical connection port, and wherein the audio device defines a third electrical connection port aligned along the axis. A fourth step 130 may include stacking a second audio device on the audio device such that the audio device and the second audio device are electrically connected to one another at the third electrical connection port, and wherein the second audio device defines a fourth electrical connection port aligned along the axis. A fifth step 132 may include stacking a second projector on the audio device such that the audio device and the second projector are electrically connected to one another at the third electrical connection port, and wherein the second projector defines a fourth electrical connection port aligned along the axis. In this method, the step of stacking the media drive device may include placing the media drive device in a position chosen from one of positioned on top of the projector, positioned below the projector and positioned next to the projector. In other methods, other sequences, steps and combinations of sequences and steps may be utilized to connect modular components 10 together to define an image display system 12.

The foregoing description of embodiments of the invention have been presented for purposes of illustration and description. It is not intended to be exhaustive or to limit the invention to the precise form disclosed, and modifications and variation are possible in light of the above teachings or may be acquired from practice of the invention. The embodiments were chosen and described in order to explain the principles of the invention and its practical application to enable one skilled in the art to utilize the invention in various embodiments and with various modification as are suited to the particular use contemplated. It is intended that the scope of the invention be defined by the claims appended hereto and their equivalents.

We claim:

1. A modular display system, comprising:
a projector including a housing defining a top surface and a bottom surface, a first connector positioned on said top surface and a second connector positioned on said bottom surface; and a media drive device including a housing defining a top surface and a bottom surface, a first connector positioned on said top surface and a second connector positioned on said bottom surface, wherein said first connectors and said second connectors of said projector and said media drive device are each positioned along a vertical axis extending through said projector and through said media drive device.

2. The system of claim 1 further comprising an audio device including a housing defining a top surface and a bottom surface, a first connector positioned on said top surface and a second connector positioned on said bottom surface, wherein said first connector and said second connector of said audio device are each positioned along said vertical axis.

3. The system of claim 2 further comprising a second projector including a housing defining a top surface and a bottom surface, a first connector positioned on said top surface and a second connector positioned on said bottom surface, wherein said first connector and said second connector of said second projector are each positioned along said vertical axis.

4. The system of claim 3 further comprising a third projector including a housing defining a top surface and a bottom surface, a first connector positioned on said top surface and a second connector positioned on said bottom surface, a fourth projector including a housing defining a top surface and a bottom surface, a first connector positioned on said top surface and a second connector positioned on said bottom surface, wherein said first connectors and said second connectors of said third and fourth projectors are each positioned along said vertical axis.

5. The system of claim 2 further comprising a second audio device including a housing defining a top surface and a bottom surface, a first connector positioned on said top surface and a second connector positioned on said bottom surface, wherein said first connector and said second connector of said second audio device are each positioned along said vertical axis.

6. The system of claim 1 wherein said vertical axis extends centrally through said modular display system.

7. The system of claim 1 wherein said housing of said projector and said housing of said media drive device each define a footprint having a shape chosen from one of a square and a circle.

8. The system of claim 4 wherein each of said projector, said second projector, said third projector and said fourth projector are each positioned to project an image in a unique direction.

9. The system of claim 1 wherein each of said first connectors is structured to mate with one of said second connectors.

10. A stackable display system, comprising:

a projector including a housing defining a first surface and a second surface positioned opposite said first surface, a first connector positioned on said first surface and a second connector positioned on said second surface; and an audio device including a housing defining a first surface and a second surface positioned opposite said first surface, a first connector positioned on said first surface and a second connector positioned on said second surface, wherein each of said first connectors is structured to mate with one of said second connectors.

11. The system of claim 10 wherein said first surface and said second surfaces are each adapted to support a stackable component there against.

12. The system of claim 10 further comprising a media drive device including a housing defining a first surface and a second surface positioned opposite said first surface, a first connector positioned on said first surface and a second connector positioned on said second surface, wherein each of said first connectors is structured to mate with one of said second connectors.

13. The system of claim 10 wherein each of said first connectors define a female connector and each of said second connectors defines a male connector.

14. A modular projector apparatus, comprising:

a plurality of stackable components, each component including a first electronic connector on a first surface and a second electronic connector on a second surface opposing said first surface, wherein said plurality of stackable components is each chosen from one of a wall projector, a ceiling projector, a DVD player, a video player, an audio system, a controller, and a storage component.

15. The apparatus of claim 14 wherein each of said stackable components is adapted is mate with another stackable component at said first surface and is adapted is mate with another stackable component at said second surface.

16. The apparatus of claim 14 wherein said plurality of stackable components are stackable in a direction chosen from one of vertical stacking and horizontal stacking.

17. The apparatus of claim 14 wherein said first surface defines a pattern and wherein said second surface defines a conforming, mating pattern to said pattern of said first surface.

18. A modular display system, comprising:

means for projecting an image stored on a display media, wherein said means for projecting an image defines a housing structured to define a repeating, uniform, structure when adjacent housings mate with one another, said housing including first means for electrical connection positioned on a first surface of said housing and second means for electrical connection positioned on a second surface of said housing, said first surface positioned opposite said second surface such that adjacent housings are electrically connected to one another by electrical connection between said first means for electrical connection and by said second means for electrical connection.

19. The system of claim 18 further comprising means for driving a display media and means for projecting an audio track stored on a display media, wherein said means for projecting an image, said means for driving a display media, and said means for projecting an audio track each define a housing structured to define a repeating, uniform, structure when adjacent housings mate with and are electrically connected to one another.

20. The system of claim 19 wherein adjacent housings are electrically connected to one another along a centrally positioned axis.

21. The system of claim 18 wherein adjacent housings are stacked in an arrangement chosen from one of a vertical stack and a horizontal stack.

22. The system of claim 18 wherein said housing defines a plurality of recessed regions on a first surface, and a plurality of outwardly extending regions on a second surface, wherein said plurality of outwardly extending regions are each positioned to mate with corresponding ones of a plurality of recessed regions on another housing, and wherein said plurality of recessed regions are each positioned to mate with corresponding ones of a plurality of outwardly extending regions on another housing when multiple housings are electrically connected together.

23. A method of connecting a display system, comprising:
positioning a projector to project an image, wherein said projector defines a first electrical connection port positioned on an axis extending through said projector; and
stacking a media drive device on said projector such that said projector and said media drive device are electrically connected to one another at said first electrical connection port, and wherein said media drive device defines a second electrical connection port spaced from said first electrical connection port and aligned along said axis.

24. The method of claim 23 further comprising stacking an audio device on said media drive device such that said media drive device and said audio device are electrically connected to one another at said second electrical connection port, and wherein said audio device defines a third electrical connection port spaced from said second electrical connection port and aligned along said axis.

25. The method of claim 24 further comprising stacking a second audio device on said audio device such that said audio device and said second audio device are electrically connected to one another at said third electrical connection port, and wherein said second audio device defines a fourth electrical connection port spaced from said third electrical connection port and aligned along said axis.

26. The method of claim 24 further comprising stacking a second projector on said audio device such that said audio device and said second projector are electrically connected to one another at said third electrical connection port, and wherein said second projector defines a fourth electrical connection port spaced from said third electrical connection port and aligned along said axis.

27. The method of claim 23 wherein said stacking comprises placing said media drive device in a position chosen from one of positioned on top of said projector, positioned below said projector and positioned next to said projector.

* * * * *